United States Patent [19]

Ashley

[11] 4,010,403
[45] Mar. 1, 1977

[54] RADIATION PROTECTED SOLID STATE VOLTAGE REGULATING APPARATUS

[75] Inventor: Albert H. Ashley, Holliston, Mass.

[73] Assignee: GTE Sylvania Incorporated, Stamford, Conn.

[22] Filed: June 27, 1974

[21] Appl. No.: 483,777

[52] U.S. Cl. .................................. 361/18; 307/308
[51] Int. Cl.² ..................... H02H 7/12; G05F 1/58
[58] Field of Search ........... 307/308; 317/9 AC, 16, 317/31, 33 VR; 323/4

[56] References Cited
UNITED STATES PATENTS

| | | | |
|---|---|---|---|
| 3,078,410 | 2/1963 | Thomas | 317/33 VR |
| 3,602,742 | 8/1971 | Husa | 307/308 |
| 3,679,963 | 7/1972 | Free et al. | 323/4 |
| 3,714,512 | 1/1973 | Grabowski | 317/33 VR |
| 3,753,078 | 8/1973 | Hedel | 317/33 VR |

*Primary Examiner*—Gerald Goldberg
*Attorney, Agent, or Firm*—David M. Keay; Elmer J. Nealon; Norman J. O'Malley

[57] ABSTRACT

Series voltage regulator including pass transistors connected between an input terminal and an output terminal. The voltage at the output terminal is stabilized by a feedback arrangement of a reference amplifier and coupling transistors connected between the output terminal and the bases of the pass transistors to control conduction through the pass transistors. A normally non-conducting protective transistor is connected between the bases of the pass transistors and ground. In the event the regulator is exposed to radiation, all the transistors become highly conductive. However, when the protective transistor becomes highly conductive, it biases the pass transistor to cutoff thus preventing the voltage at the output terminal from rising out of control.

7 Claims, 1 Drawing Figure

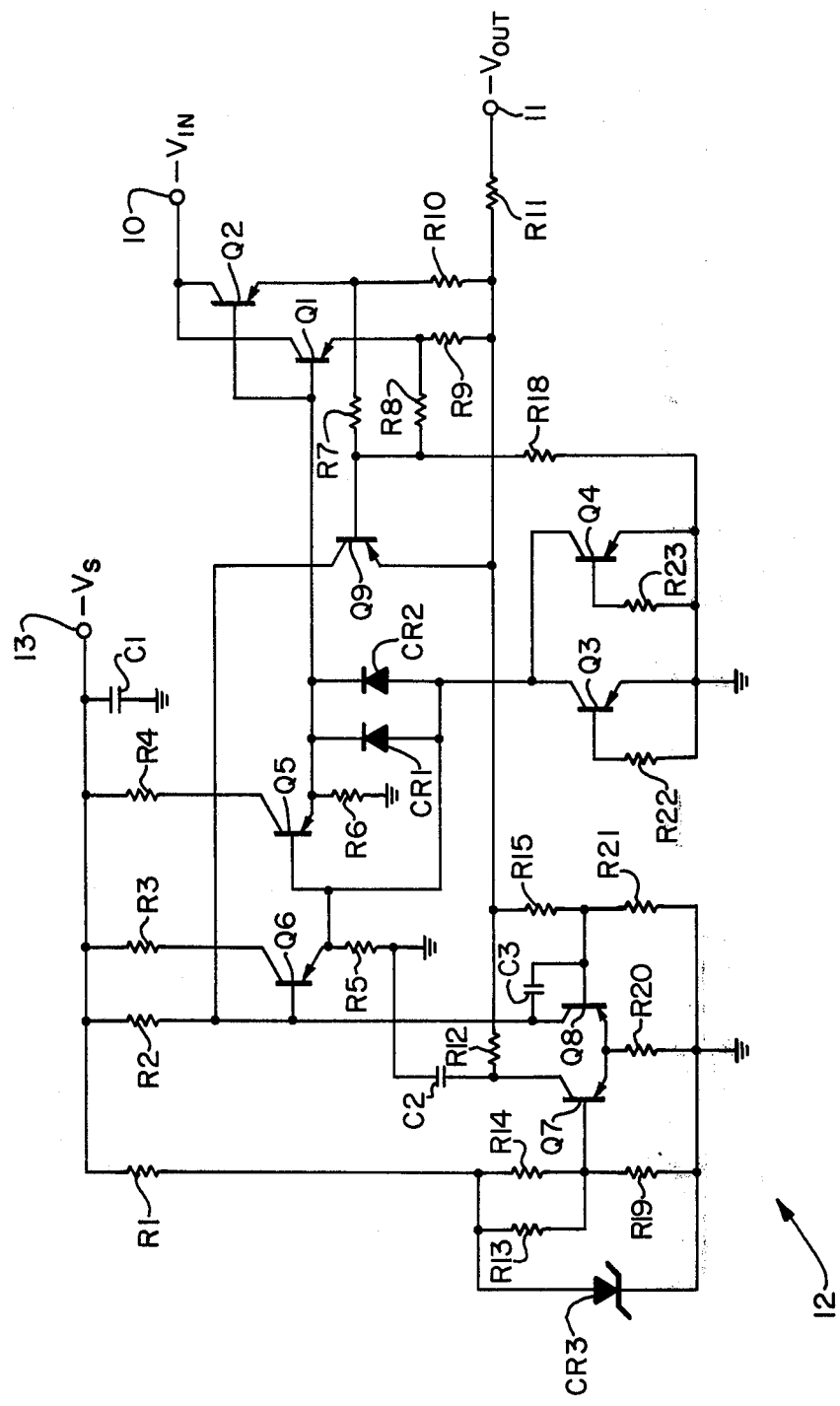

RADIATION PROTECTED SOLID STATE VOLTAGE REGULATING APPARATUS

BACKGROUND OF THE INVENTION

This invention relates to voltage regulators. More particularly, it is concerned with solid state series voltage regulator apparatus for operation in an environment which may be subject to radiation.

Many types of voltage regulators which operate to provide a stable output voltage are well-known. A voltage regulator may be required, for example, to supply operating voltages to devices which are particularly sensitive to overvoltage conditions in order to prevent damage from transients caused by various occurrences. Voltage regulators commonly employ solid state devices such as transistors. However, solid state devices become highly conductive when exposed to radiation. Thus, if solid state regulators are subjected to radiation, the transistors become highly conductive permitting the output voltage of the regulator to vary out of control and possibly damage the devices the regulator is intended to protect.

An apparent solution in order to protect devices operating from a voltage regulator in an environment which is subject to radiation would be to employ a shunt type of voltage regulator. In voltage regulators of this type excess current would be bypassed away from the devices operating from the regulator output. However, for many applications there are problems in employing a shunt regulator. In particular, the amount of current flow and therefore the amount of energy to be dissipated may be exceptionally large under certain conditions.

SUMMARY OF THE INVENTION

An improved voltage regulator in accordance with the present invention which provides protection when employed in an environment subject to radiation is a series regulator. Pass transistor means are connected between an input terminal which is adapted to have a potential applied thereto and an output terminal at which the regulated output voltage is produced. The potential at the output terminal is determined by the electrical current flow through the pass transistor means. A control signal applied to the pass transistor means controls the current flow therethrough. A voltage reference means is coupled to the output terminal and produces a control signal which is related to the potential at the output terminal. A coupling means couples the control signal from the voltage reference means to the pass transistor means. The foregoing elements of the apparatus operate to produce a stable voltage at the output terminal. A change in the potential at the output terminal causes the voltage reference means to change the control signal so as to change the current flow through the pass transistor means in a direction to restore the potential at the output terminal to its original value.

In order to provide protection and prevent the voltage at the output terminal from exceeding its normal stable value when the apparatus is exposed to radiation, a protective transistor means is coupled to the pass transistor means. The protective transistor means is normally biased in a non-conducting condition. In response to radiation which causes the pass transistor means and the protective transistor means to become highly conductive the protective transistor means biases the pass transistor means to a non-conductive condition. Thus, if radiation causes all of the transistors in the apparatus to become highly conductive, the high conduction through the protective transistor means causes the pass transistor means to be turned off. Current flow from the input terminal to the output terminal is thus terminated preventing an overvoltage condition from being produced at the output terminal despite the loss of control by the feedback regulating arrangement.

BRIEF DESCRIPTION OF THE DRAWINGS

Additional objects, features, and advantages of voltage regulating apparatus in accordance with the present invention will be apparent from the following detailed discussion together with the accompanying drawing in which the single figure is a schematic circuit diagram of a series voltage regulator in accordance with the present invention.

DETAILED DESCRIPTION OF THE INVENTION

The voltage regulating apparatus in accordance with the present invention is illustrated in the drawing includes an input terminal 10 for applying a voltage $-V_{IN}$ and an output terminal 11 at which is produced a regulated output voltage $-V_{OUT}$. In the specific embodiment under discussion the voltage $-V_{IN}$ applied at the input terminal 10 and the voltage $-V_{OUT}$ at the output terminal 11 are negative voltages and all the transistors are PNP bipolar transistors. Current flow from the input terminal 10 to the output terminal 11 which establishes the voltage at the output terminal 11 is controlled by pass transistors Q1 and Q2.

Two pass transistors Q1 and Q2 connected in parallel are employed in order to provide sufficient current carrying capacity. The pass transistor arrangement is connected in series between the input terminal 10 and the output terminal 11. The collectors of transistors Q1 and Q2 are connected directly to each other and to the input terminal 10. The bases are connected directly to each other. The emitters of transistors Q1 and Q2 are connected through resistances R9 and R10, respectively, to a common juncture which is connected through resistance R11 to the output terminal 11.

The juncture of resistances R9, R10, and R11 is connected to a voltage reference arrangement 12 of two transistors Q7 and Q8 in a differential amplifier arrangement. The emitters of transistors Q7 and Q8 are connected directly to each other and through a resistance R20 to ground. The base of transistor Q8 is connected to the juncture between two resistances R15 and R21 which form a voltage divider between the juncture of resistances R9 and R10 and ground. A capacitance C3 is connected between the collector and base of transistor Q8. The collector of transistor Q8 is connected through a resistance R2 to a supply voltage terminal 13 to which is applied a source of negative operating voltage $-V_S$.

The collector of the other transistor Q7 of the differential amplifier is connected through a resistance R12 to the juncture of resistances R9 and R10 and through a capacitance C2 to ground. The base of transistor Q7 is connected to a point of fixed reference potential produced by a voltage divider of resistances R14 and R19 connected across a Zener regulating diode CR3. A trimming resistance R13 is connected in parallel with the resistance R14. The Zener diode CR3 is connected to ground and through a resistance R1 to the supply voltage terminal 13. The Zener diode CR3 establishes a stable voltage across resistances R14 and R19 and, therefore, a fixed reference voltage is produced at the base of transistor Q7.

A first coupling transistor Q6 has its base connected directly to the collector of transistor Q8, its collector connected through a resistance R3 to the supply voltage terminal 13, and its emitter connected through a resistance R5 to ground. A second coupling transistor Q5 has its base connected directly to the emitter of the first coupling transistor Q6 and its collector through a resistance R4 to the supply voltage terminal 13. The emitter of transistors Q5 is connected directly to the bases of pass transistors Q1 and Q2 and through a resistance R6 to ground.

An arrangement for protecting the voltage regulator circuit itself in the event the output terminal 11 is short-circuited to ground includes a transistor Q9 having its collector connected directly to the base of transistor Q6 and its emitter connected directly to the juncture of resistances R9 and R10. The base of transistor Q9 is connected to the emitter of pass transistor Q1 through a resistance R8 and to the emitter of pass transistor Q2 through a resistance R7. The base of transistor Q9 is also connected to ground through a resistance R18.

The circuitry for preventing the apparatus from producing an excessive value of voltage $-V_{OUT}$ at the output terminal 11 in the event of radiation exposure includes a protective transistor Q3 having its collector connected directly to the base of the second coupling transistor Q5 and through diodes CR1 and CR2, in parallel, to the bases of the pass transistors Q1 and Q2. The emitter of transistor Q3 is connected directly to ground and its base is connected to ground through a resistance R22. A second protective transistor Q4 is connected in parallel with the first protective transistor Q3. The collector of transistor Q4 is connected directly to the collector of transistor Q3, its emitter is connected directly to ground, and its base is connected to ground through a resistance R23. The second protective transistor is not required in order for the protective feature to function properly, but is merely a back-up providing increased reliability.

The apparatus as described operates in the following manner under normal conditions to maintain the output voltage at the output terminal 11 constant. Assuming, for example, a tendency for the voltage at the output terminal 11 to increase in a negative direction, the negative voltage at the base of transistor Q8 of the reference amplifier 12 increases. Increasing current in the collector circuit of transistor Q8, including resistance R2, causes the voltage at the base of the first coupling transistor Q6 to become less negative therefore causing current through that transistor to decrease. Decreased current flow through the emitter circuit of transistor Q6 causes the potential at the base of the second coupling transistor Q5 to become less negative and conduction in that transistor decreases. Decreased current flow in the emitter circuit of transistor Q5 causes the potential at the base of the pass transistors Q1 and Q2 to become less negative. Conduction through transistors Q1 and Q2 decreases causing the voltage at the output terminal 11 to decrease in a negative direction. Feedback from the output terminal to the pass transistors Q1 and Q2 through the reference amplifier 12 and the coupling transistors Q6 and Q5 thus tends to maintain the output voltage $-V_{OUT}$ at a stable level.

The elements of the apparatus operate in the opposite manner to increase current through the pass transistors Q1 and Q2 to overcome a tendency for the output voltage $-V_{OUT}$ to become less negative. Under these circumstances the base of transistor Q8 of the reference amplifier 12 becomes less negative causing decreased current in its collector circuit. The voltage at the base of the first coupling transistor Q6 becomes more negative and current flow through transistor Q6 increases. Increased current in its emitter circuit causes the base of the second coupling transistor Q5 to become more negative. Current through transistor Q5 and its emitter circuit increases thereby increasing the voltage at the bases of transistors Q1 and Q2. Conduction through transistors Q1 and Q2 increases causing the voltage at the output terminal 11 to increase in a negative direction. Again, the feedback from the output terminal to the pass transistors Q1 and Q2 through the reference amplifier 12 and the coupling transistors Q6 and Q5 tends to maintain the output voltage $-V_{OUT}$ at a stable level.

As indicated previously the apparatus also includes elements for preventing damage in the event the output terminal 11 becomes short-circuited to ground. Under normal operating conditions transistor Q9 remains biased in a non-conducting condition passing only leakage current and having no effect on the feedback stabilizing function of the regulator. If the voltage at the output terminal approaches ground, however, transistor Q9 is biased to conduction and collector current flows through its collector circuit including resistance R2. The potential at the base of the first coupling transistor Q6 becomes less, and current through transistor Q6 decreases. Current through transistor Q5 also decreases causing the current through transistors Q1 and Q2 to decrease. If transistor Q9 is driven to heavy conduction, transistor Q6 is biased to cut off, and consequently transistors Q1 and Q2 are cut off. Thus, transistor Q9 acts to control the feedback path to the pass transistors Q1 and Q2 and prevent the flow of excessive current therethrough.

The voltage regulator as described operates in a typical manner to provide a stable output voltage and protect devices connected to the output terminal. As is well understood in the semiconductor art, if the apparatus becomes exposed to radiation, the transistors become highly conductive. As is apparent from the circuit diagram and the foregoing discussion, if the pass transistors Q1 and Q2 conduct heavily, the voltage at the output terminal 11 increases out of control. Such an overvoltage condition would likely cause damage to whatever devices are operating from the output voltage $-V_{OUT}$.

The protective transistors Q3 and Q4, however, also become highly conductive when the regulator is exposed to radiation. When either or both of the protective transistors Q3 and Q4 conducts, current flows in the collector circuit causing the potential at the bases of the pass transistors Q1 and Q2 and also at the base of the second coupling transistor Q5 to become less negative. Thus, the pass transistors Q1 and Q2 and the second coupling transistor Q5 are biased to a non-conducting or cutoff condition. With the current through transistors Q1 and Q2 cut off, the voltage $-V_{OUT}$ at the output terminal 11 does not rise out of control and devices connected to the output terminal 11 are not subjected to overvoltage conditions.

It is desirable that protective transistors Q3 and Q4 be of the same type or have electrical characteristics similar to the pass transistors Q1 and Q2 so that the effects of radiation on the protective transistors and the pass transistors will be of essentially the same order of magnitude. Since the principal effect of gamma radiation is to cause a peak primary current in a transistor which has the same effect as a burst of base current, it is particularly desirable that the junctions in the protective and pass transistors be of approximately the same size. Amplification by the protective transistors causes sufficient current flow in the collector circuit to more than compensate for the peak primary current induced in the pass transistors and insure that the pass transistors are cut off.

One specific embodiment of a series voltage regulator in accordance with the present invention as shown in the drawing has been fabricated employing the components as listed below.

| Q1–Q4 | 2N3792 | R9 | 0.8 Ω |
|---|---|---|---|
| Q5–Q9 | 2N2905A | R10 | 0.8 Ω |
| CR1 and CR2 | 1N914 | R11 | 0.1 Ω |
| CR3 | 1N821 | R12 | 178 Ω |
| C1 | 0.1 μf | R13 | 13.7 kΩ |
| C2 | 0.1 μf | R14 | 1.07 kΩ |
| C3 | 0.01 μf | R15 | 1 kΩ |
| R1 | 1.1 kΩ | R18 | 562 Ω |
| R2 | 14.7 kΩ | R19 | 1 kΩ |
| R3 | 1 kΩ | R20 | 11 kΩ |
| R4 | 53.6Ω | R21 | 1 kΩ |
| R5 | 10 kΩ | R22 | 3.01 kΩ |
| R6 | 1 kΩ | R23 | 3.01 kΩ |
| R7 | 178 Ω | $-V_s$ | $-18$ volts |
| R8 | 178 Ω | $-V_{IN}$ | $-10$ volts |

Apparatus fabricated with the foregoing components provided a stabilized output voltage $-V_{OUT}$ at the output terminal 11 of $-6$ volts. The series voltage regulator as shown and described provides a stable output voltage under normal operating conditions and also provides protection from transients caused by radiation.

While there has been shown and described what is considered a preferred embodiment of the present invention, it will be obvious to those skilled in the art that various changes and modifications may be made therein without departing from the invention as defined by the appended claims.

What is claimed is:

1. Voltage regulating apparatus comprising
an input terminal adapted to have a potential applied thereto;
an output terminal;
pass transistor means connected between the input terminal and the output terminal, current flow through the pass transistor means being controlled by a control signal applied thereto;
voltage reference means coupled to the output terminal for producing a control signal related to the potential at the output terminal;
coupling means for coupling the control signal from the voltage reference means to the pass transistor means;
a change in the potential at the output terminal causing the voltage reference means to change the control signal so as to change the current flow through the pass transistor means to restore the potential at the output terminal to its original value whereby the potential at the output terminal is stabilized; and
protective transistor means coupled to the pass transistor means, said protective transistor means being normally biased in a non-conducting condition and being operable in response to radiation causing the pass transistor means and the protective transistor means to become highly conductive to bias the pass transistor means to a non-conducting condition;
wherein
said pass transistor means includes a pass transistor having a control input electrode connected to the coupling means for receiving the control signal therefrom; and
said protective transistor means includes a protective transistor connected in series between said control input electrode and a point of fixed potential, whereby when said protective transistor becomes highly conductive in response to radiation the potential at the control input electrode approaches the fixed potential biasing the pass transistor to a non-conducting condition.

2. Voltage regulating apparatus in accordance with claim 1 wherein
said pass transistor has its collector connected to the input and its emitter connected to the output terminal, its base being said control input electrode.

3. Voltage regulating apparatus in accordance with claim 2 wherein
said protective transistor has its collector connected to the base of said pass transistor and its emitter connected to the point of fixed potential.

4. Voltage regulating apparatus in accordance with claim 3 wherein
said coupling means includes
first and second coupling transistors,
said first coupling transistor having its base connected to the voltage reference means,
said second coupling transistor having its base connected to the emitter of the first coupling transistor and to the collector of said protective transistor, and its emitter connected to the base of said pass transistor; and
said protective transistor is operable when highly conductive in response to radiation to bias the second coupling transistor to a non-conducting condition.

5. Voltage regulating apparatus in accordance with claim 4 wherein
said voltage reference means includes
two transistors in a differential amplifier arrangement;
said output terminal being coupled to the base of a first of the two transistors;
means for producing a fixed reference voltage at the base of the second of the two transistors; and
the collector of one of the transistors being connected to the base of said first coupling transistor.

6. Voltage regulating apparatus in accordance with claim 5 wherein
the junctions of said pass transistor and said protective transistor are of approximately equal size.

7. Voltage regulating apparatus in accordance with claim 6 including
a short-circuit protection transistor having its emitter connected to the output terminal, its base connected to the emitter of the pass transistor, and its collector connected to the base of the first coupling transistor;

said short-circuit protection transistor being normally biased in a non-conducting condition and being biased to a high conducting condition in response to the output terminal being short-circuited thereby biasing the first coupling transistor and the pass transistor to non-conducting conditions.

* * * * *